US009509431B2

(12) United States Patent
Luo et al.

(10) Patent No.: US 9,509,431 B2
(45) Date of Patent: Nov. 29, 2016

(54) METHOD AND APPARATUS FOR CONTROLLING AN OPTICAL NETWORK UNIT TO RESTART UPON COMPLETION OF DOWNLOADING NEW SOFTWARE

(75) Inventors: Haijun Luo, Shanghai (CN); Wenlin Zhang, Shanghai (CN); Lin Li, Shanghai (CN); Yijun Xu, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 439 days.

(21) Appl. No.: 14/117,423

(22) PCT Filed: Jun. 15, 2012

(86) PCT No.: PCT/IB2012/001447
§ 371 (c)(1),
(2), (4) Date: Nov. 13, 2013

(87) PCT Pub. No.: WO2012/172431
PCT Pub. Date: Dec. 20, 2012

(65) Prior Publication Data
US 2014/0294389 A1 Oct. 2, 2014

(30) Foreign Application Priority Data

Jun. 15, 2011 (CN) .......................... 2011 1 0161000

(51) Int. Cl.
G06F 9/44 (2006.01)
H04J 14/02 (2006.01)
(Continued)

(52) U.S. Cl.
CPC ........... *H04J 14/0227* (2013.01); *G06F 8/665* (2013.01); *H04B 10/27* (2013.01); *H04Q 11/0067* (2013.01); *H04Q 2011/0079* (2013.01)

(58) Field of Classification Search
None
See application file for complete search history.

(56) References Cited

U.S. PATENT DOCUMENTS 7,200,390 B1  4/2007 Henager et al.
7,937,078 B2 * 5/2011 Okita .................. G06F 8/65
                                          455/418

(Continued)

FOREIGN PATENT DOCUMENTS

CN  1929394 A  3/2007
EP  1765013 A1  3/2007

(Continued)

OTHER PUBLICATIONS

International Search Report PCT/ISA/210 for International Application No. PCT/IB2012/001447 Dated Dec. 7, 2012.

(Continued)

*Primary Examiner* — Jason Mitchell
(74) *Attorney, Agent, or Firm* — Harness, Dickey & Pierce, P.L.C.

(57) ABSTRACT

The invention provides a method and apparatus for controlling an optical network unit to restart upon completion of downloading new software. Upon completion of downloading a new software version, an optical network terminal firstly determines a type of an active image request to be transmitted based upon stored values, of a RstDelayTimeRange attribute and of a RstDelayTrafficThreshold attribute, corresponding to the optical network unit, and then transmits the active image request to the optical network unit. The determined active image request may be a first active image request to instruct the optical network unit to immediately restart and activate the new software version that has been downloaded, or may be a second active image request to instruct the optical network unit to set an activation flag and a third active image request to instruct the optical network unit to immediately restart, both of which are used in combination.

11 Claims, 2 Drawing Sheets

(51) Int. Cl.
*G06F 9/445* (2006.01)
*H04Q 11/00* (2006.01)
*H04B 10/27* (2013.01)

(56) References Cited

U.S. PATENT DOCUMENTS

| | | | |
|---|---|---|---|
| 9,037,887 B2 * | 5/2015 | Gupta | G06F 1/32 455/574 |
| 2005/0210459 A1 | 9/2005 | Henderson et al. | |
| 2008/0288936 A1 * | 11/2008 | Ikeda | G06F 8/65 717/173 |
| 2009/0070756 A1 * | 3/2009 | Wei | G06F 8/65 717/172 |
| 2011/0099545 A1 * | 4/2011 | Lee | G06F 8/65 717/172 |
| 2011/0131447 A1 * | 6/2011 | Prakash | G06F 21/572 714/19 |
| 2011/0265072 A1 | 10/2011 | Matthew | |
| 2012/0124571 A1 * | 5/2012 | Nagai | G06F 8/61 717/173 |
| 2014/0376405 A1 * | 12/2014 | Erickson | H04W 52/0212 370/254 |
| 2015/0373561 A1 * | 12/2015 | Huang | H04W 24/02 370/252 |

FOREIGN PATENT DOCUMENTS

| | | |
|---|---|---|
| EP | 1811718 A1 | 7/2007 |
| JP | 2007195181 A | 8/2007 |
| KR | 20070031110 A | 3/2007 |
| KR | 20110059302 A | 6/2011 |
| WO | WO-2004098218 A1 | 11/2004 |

OTHER PUBLICATIONS

Office Action for corresponding Chinese Application No. 201110161000.6 dated Jun. 25, 2014 and English translation thereof.

Office Action for corresponding Taiwanese Application No. 101121408 dated Feb. 21, 2014 and English translation thereof.

Wu Liang et al., "The Application of Reset Delay in ONU Software Upgrade," College of Electronic and Information Engineering, Tongji University, pp. 66-67, 2011.

* cited by examiner

METHOD AND APPARATUS FOR CONTROLLING AN OPTICAL NETWORK UNIT TO RESTART UPON COMPLETION OF DOWNLOADING NEW SOFTWARE

FIELD OF THE INVENTION

The present application relates to an optical communication network and particularly to an Optical Line Terminal (OLT) and an Optical Network Unit (ONU) in systems of an Ethernet Passive Optical Network (EPON) and a Gigabit Passive Optical Network (GPON).

BACKGROUND OF THE INVENTION

In EPON and GPON systems, an optical line terminal must be able to upgrade remotely the software version of an optical network unit. After all the data blocks of the new software version are received accurately, the optical network unit will immediately restart and automatically activate the new software version. From the perspective of downloading software, the foregoing operation of the optical network unit is proper, but the operation may interrupt user services, particularly voice and video services.

Therefore it is desirable to provide a solution which can address this technical problem.

SUMMARY OF THE INVENTION

In view of the foregoing problem, the usage of an active image request has been extended in the invention, that is, the original active image request (hereinafter referred to as "a first active image request") is reserved while a second active image request and a third active image request are newly introduced.

The flag field of the original first active image request is assigned with 0, for example, that is, flag=0, to instruct the optical network unit to immediately restart and activate the new software version that has been downloaded.

The flag field of the newly introduced second active image request is assigned with 1, for example, that is, flag=1, to instruct the optical network unit to set an activation flag to indicate that the new software version that has been downloaded shall be activated upon next time of restarting.

The flag field of the newly introduced third active image request is assigned with 2, for example, that is, flag=2, to instruct the optical network unit to immediately restart.

Particularly the first active image request is used alone, and the second active image request and the third active image request are used in combination, which will be described below in details.

Furthermore two attributes of the optical network unit are also introduced in the invention, respectively the Restart Delay Time Range (RstDelayTimeRange) attribute and the Restart Delay Traffic Threshold (RstDelayTrafficThreshold) attribute.

The RstDelayTimeRange attribute is used for indicating the time range or the time value in or at which the traffic detection is performed on the optical network unit, and the RstDelayTrafficThreshold attribute is used for indicating the upper traffic limit below or at which the optical network unit is determined to be in a silent state, which will be described below in details.

Hereupon in an embodiment of the invention, there is provided a method, in an optical line terminal of an optical communication network, of instructing an optical network unit to restart. The method comprises the steps of: a. upon completion of downloading a new software version, determining a type of an active image request to be transmitted based upon stored values of an RstDelayTimeRange attribute and of an RstDelayTrafficThreshold attribute corresponding to the optical network unit, wherein the RstDelayTimeRange attribute is used for indicating a time range or a time value in or at which a traffic detection is performed on the optical network unit, and the RstDelayTrafficThreshold attribute is used for indicating an upper traffic limit below or at which the optical network unit is determined to be in a silent state; and b. transmitting the active image request to the optical network unit.

Optionally the step a comprises the step of: if the value of the RstDelayTimeRange attribute and the value of the RstDelayTrafficThreshold attribute indicate that no time delay is required and no traffic detection is required to be performed on the optical network unit, then a first active image request is determined to be the active image request to be transmitted, and the step b comprises the step of: transmitting the first active image request to the optical network unit, wherein the first active image request is used for instructing the optical network unit to immediately restart and activate the new software version that has been downloaded, and wherein after the step b, the method further comprises the step of: receiving a first active image response corresponding to the first active image request from the optical network unit.

Optionally the step a comprises the step of: if the value of the RstDelayTrafficThreshold attribute indicates that no traffic detection is required to be performed on the optical network unit and the value of the RstDelayTimeRange attribute indicates a specific time value, then determining a second active image request to be the active image request to be transmitted, and the step b comprises the step of: transmitting the second active image request to the optical network unit, wherein the second active image request is used for instructing the optical network unit to set an activation flag to indicate that the new software version that has been downloaded shall be activated upon next time of restarting, and wherein after the step b, the method further comprises the steps of: c. receiving a second active image response corresponding to the second active image request from the optical network unit; d. transmitting a third active image request to the optical network unit at the specific time value indicated by the value of the RstDelayTimeRange attribute, wherein the third active image request is used for instructing the optical network unit to immediately restart; and e. receiving a third active image response corresponding to the third active image request from the optical network unit.

Optionally the step a comprises the step of: if the value of the RstDelayTrafficThreshold attribute indicates that the traffic detection is required to be performed on the optical network unit, then a second active image request is determined to be the active image request to be transmitted, and the step b comprises the step of: transmitting the second active image request to the optical network unit, wherein the second active image request is used for instructing the optical network unit to set an activation flag to indicate that the new software version that has been downloaded shall be activated upon next time of restarting, and wherein after the step b, the method further comprises the steps of: c'. receiving a second active image response corresponding to the second active image request from the optical network unit; d'. performing the traffic detection on the optical network unit in the time range or at the time value indicated by the value of the RstDelayTimeRange attribute; e'. when the detected traffic is below or equal to the value of the RstDelayTrafficThreshold attribute, transmitting a third active image request to the optical network unit, wherein the third active image request is used for instructing the optical network unit to immediately restart; and f. receiving a third active image response corresponding to the third active image request from the optical network unit.

In another embodiment of the invention, there is provided a method, in an optical line terminal of an optical communication network, of instructing an optical network unit to restart. The method comprises the steps of: A. upon completion of downloading a new software version, detecting traffic of the optical network unit based upon stored values, of an RstDelayTimeRange attribute and of an RstDelayTrafficThreshold attribute, corresponding to the optical network unit, wherein the RstDelayTimeRange attribute is used for indicating a time range in which a traffic detection is performed on the optical network unit, and the RstDelayTrafficThreshold attribute is used for indicating an upper traffic limit below or at which the optical network unit is determined to be in a silent state; B. when the detected traffic is below or equal to the value of the RstDelayTrafficThreshold attribute, transmitting a first active image request to the optical network unit, wherein the first active image request is used for instructing the optical network unit to immediately restart and activate the new software version that has been downloaded; and C. receiving a first active image response corresponding to the first active image request from the optical network unit.

In a further embodiment of the invention, there is provided a method, in an optical network unit of an optical communication network, for restarting in response to an instruction of an optical line terminal. The method comprises the steps of: i. upon completion of downloading a new software version, receiving an active image request from the optical line terminal; and ii. determining a type of the active image request and performing an operation corresponding to the type of the active image request according to the type.

Optionally the step ii comprises the step of: if the active image request is a first active image request, then transmitting a first active image response corresponding to the first active image request to the optical line terminal and immediately restarting and activating the new software version that has been downloaded.

Optionally the step ii comprises the step of: if the active image request is a second active image request, then transmitting a second active image response corresponding to the second active image request to the optical line terminal and setting an activation flag to indicate that the new software version that has been downloaded shall be activated upon next time of restarting, and after the step ii, the method further comprises the steps of: iii. receiving a third active image request from the optical line terminal; and iv. transmitting a third active image response corresponding to the third active image request to the optical line terminal and restarting immediately.

By applying the technical solution of the invention, upon completion of downloading a new software version, the optical network unit will restart only if the optical network unit is in a silent status, that is, the optical network unit will not restart to activate the new software version when the optical network unit is busy with providing a network service, thereby ensuring to the maximum extent that the ongoing network service will not be interrupted.

In a further embodiment of the invention, there is provided an apparatus, in an optical line terminal of an optical communication network, for instructing an optical network unit to restart. The apparatus comprises: a first determination device for, upon completion of downloading a new software version, determining a type of an active image request to be transmitted based upon stored values, of a RstDelayTimeRange attribute and of a RstDelayTrafficThreshold attribute, corresponding to the optical network unit, wherein the RstDelayTimeRange attribute is used for indicating a time range or a time value in or at which a traffic detection is performed on the optical network unit, and the RstDelayTrafficThreshold attribute is used for indicating an upper traffic limit below or at which he optical network unit is determined to be in a silent state; and a first transmission device for transmitting the determined active image request to the optical network unit.

Optionally the first determination device is for: if the value of the RstDelayTimeRange attribute and the value of the RstDelayTrafficThreshold attribute indicate that no time delay is required and no traffic detection is required to be performed on the optical network unit, then determining a first active image request to be the active image request to be transmitted, and the first transmission device is for: transmitting the first active image request to the optical network unit, wherein the first active image request is used for instructing the optical network unit to immediately restart and activate the new software version that has been downloaded, and wherein the apparatus further comprises: a first reception device for receiving a first active image response corresponding to the first active image request from the optical network unit.

Optionally the first determination device is for: if the value of the RstDelayTrafficThreshold attribute indicates that no traffic detection is required to be performed on the optical network unit and the value of the RstDelayTimeRange attribute indicates a specific time value, then determining a second active image request to be the active image request to be transmitted, and the first transmission device is for: transmitting the second active image request to the optical network unit, wherein the second active image request is used for instructing the optical network unit to set an activation flag to indicate that the new software version that has been downloaded shall be activated upon next time of restarting, and wherein the apparatus further comprises: a second reception device for receiving a second active image response corresponding to the second active image request from the optical network unit; a second transmission device for transmitting a third active image request to the optical network unit at the specific time value indicated by the value of the RstDelayTimeRange attribute, wherein the third active image request is used for instructing the optical network unit to immediately restart; and a third reception device for receiving a third active image response corresponding to the third active image request from the optical network unit.

Optionally the first determination device is for: if the value of the RstDelayTrafficThreshold attribute indicates that the traffic detection is required to be performed on the optical network unit, then determining a second active image request to be the active image request to be transmitted, and the first transmission device is for: transmitting the second active image request to the optical network unit, wherein the second active image request is used for instructing the optical network unit to set an activation flag to indicate that the new software version that has been downloaded shall be activated upon next time of restarting, and wherein the apparatus further comprises: a fourth reception device for receiving a second active image response corresponding to the second active image request from the optical network unit; a first detection device for performing the traffic detection on the optical network unit in the time range or at the time value indicated by the value of the RstDelayTimeRange attribute; a third transmission device for, when the detected traffic is below or equal to the value of the RstDelayTrafficThreshold attribute, transmitting a third active image request to the optical network unit, wherein the third active image request is used for instructing the optical network unit to immediately restart; and a fifth reception device for receiving a third active image response corresponding to the third active image request from the optical network unit.

In a further embodiment of the invention, there is provided an apparatus, in an optical line terminal of an optical communication network, of instructing an optical network unit to restart. The apparatus comprises: a second detection device for, upon completion of downloading a new software version, detecting traffic of the optical network unit based upon stored values, of a RstDelayTimeRange attribute and of a RstDelayTrafficThreshold attribute, corresponding to the optical network unit, wherein the RstDelayTimeRange attribute is used for indicating a time range or a time value in or at which a traffic detection is performed on the optical network unit, and the RstDelayTrafficThreshold attribute is used for indicating an upper traffic limit below or at which the optical network unit is determined to be in a silent state; a fourth transmission device for, when the detected traffic is below or equal to the value of the RstDelayTrafficThreshold attribute, transmitting a first active image request to the optical network unit, wherein the first active image request is used for instructing the optical network unit to immediately restart and activate the new software version that has been downloaded; and a sixth reception device for receiving a first active image response corresponding to the first active image request from the optical network unit.

In a further embodiment of the invention, there is provided an apparatus, in an optical network unit of an optical communication network, for restarting in response to an instruction of an optical line terminal. The apparatus comprises: a seventh reception device for receiving an active image request from the optical line terminal upon completion of downloading a new software version; and an execution device for determining a type of the active image request and performing an operation corresponding to the type of the active image request according to the type.

Optionally the execution device is for: if the active image request is a first active image request, then transmitting a first active image response corresponding to the first active image request to the optical line terminal and immediately restarting and activating the new software version that has been downloaded.

Optionally the execution device is for: if the active image request is a second active image request, then transmitting a second active image response corresponding to the second active image request to the optical line terminal and setting an activation flag to indicate that the new software version that has been downloaded shall be activated upon next time of restarting, and the apparatus further comprises: an eighth reception device for receiving a third active image request from the optical line terminal; and a fifth transmission device for transmitting a third active image response corresponding to the third active image request to the optical line terminal and immediately restarting.

Respective aspects of the invention will become more apparent from the following description of embodiments thereof.

BRIEF DESCRIPTION OF DRAWINGS

The foregoing and other features of the invention will become more apparent upon review of the following detailed description of non-limiting embodiments with reference to the drawings in which.

Identical or similar reference numerals denote identical or similar components throughout the drawings.

DETAILED DESCRIPTION OF EMBODIMENTS

Figure 1:
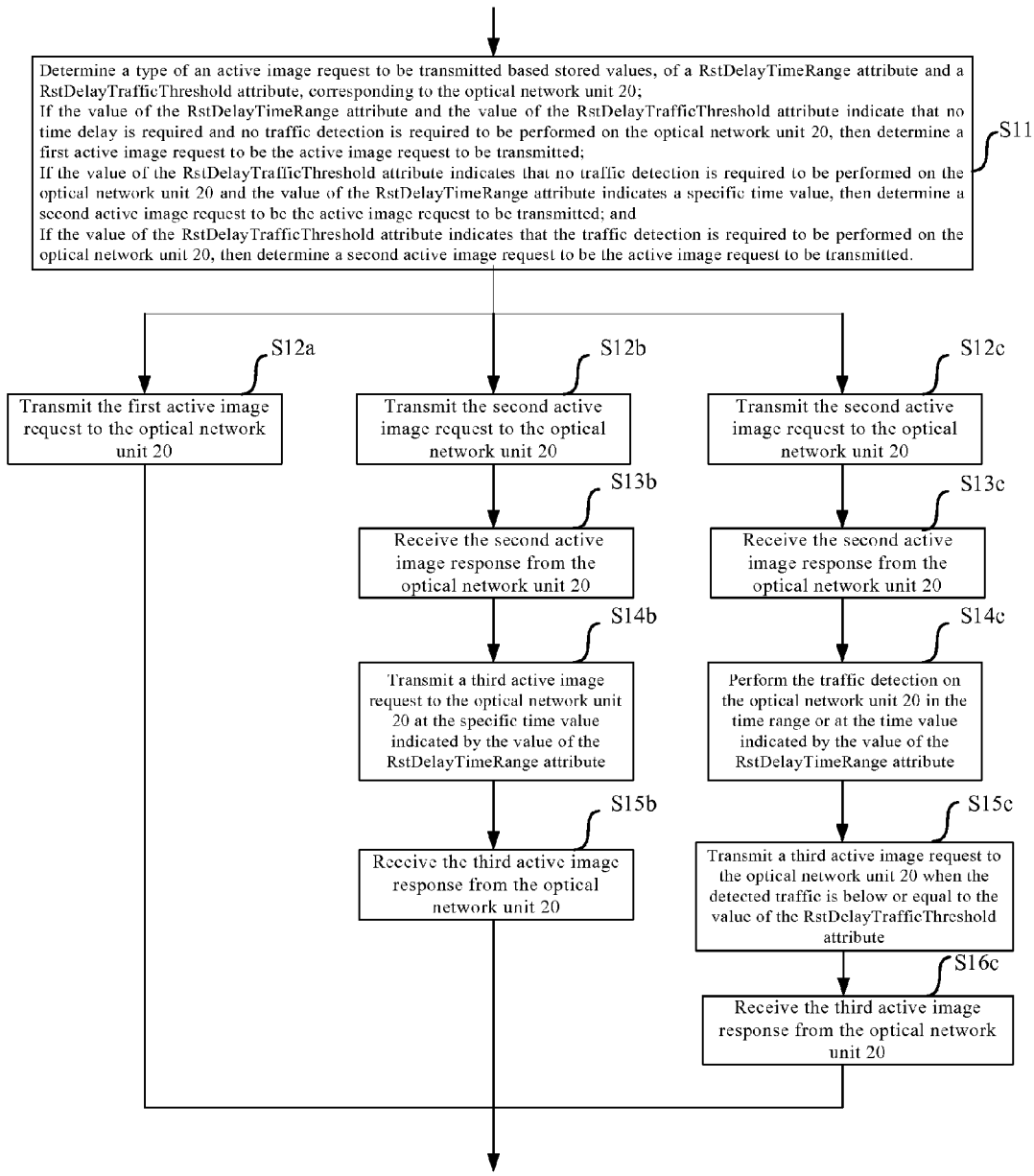
FIG. 1 is a flow chart of a method of controlling an optical network unit to restart upon completion of downloading new software according to an embodiment of the invention.

In order to implement technical solutions of the invention, the use of the active image request defined in "CTC EPON Device Technique Requirement Specification V2.1" shall be extended. As described above, in the invention, the original active image request (hereinafter referred to as "a first active image request") is reserved while a second active image request and a third active image request are newly introduced.

The flag field of the original first active image request is assigned with 0, for example, that is, flag=0, to instruct the optical network unit to immediately restart and activate a new software version that has been downloaded. The first active image request is in the following format.

| 2 bytes | 1 byte |
|---|---|
| Opcode=8 | Flag=0 |

Wherein Opcode is an operation code field assigned with 8 and in a length of 2 bytes, and Flag is a flag field assigned with 0 and in a length of 1 byte.

The flag field of the newly introduced second active image request is assigned with 1, for example, that is, flag=1, to instruct the optical network unit to set an activation flag to indicate that the new software version that has been downloaded shall be activated upon next time of restarting. The second active image request is in the following format.

| 2 bytes | 1 byte |
|---|---|
| Opcode=8 | Flag=1 |

Wherein Opcode is an operation code field assigned with 8 and in a length of 2 bytes, and Flag is a flag field assigned with 1 and in a length of 1 byte.

The flag field of the newly introduced third active image request is assigned with 2, for example, that is, flag=2, to instruct the optical network unit to immediately restart. The third active image request is in the following format.

| 2 bytes | 1 byte |
|---|---|
| Opcode=8 | Flag=2 |

Wherein Opcode is an operation code field assigned with 8 and in a length of 2 bytes, and Flag is a flag field assigned with 2 and in a length of 1 byte.

Moreover, in the invention, the active image response defined in "CTC EPON Device Technique Requirement Specification V2.1" remains unaltered and is in the following format.

| 2 bytes | 1 byte |
|---------|--------|
| Opcode=9 | ACK |

Wherein Opcode is an operation code field assigned with 9 and in a length of 2 bytes, and ACK is an acknowledgement field in a length of 1 byte.

Furthermore, in order to implement technical solutions of the invention, two attributes of the optical network unit are newly introduced in the invention, respectively a Restart Delay Time Range (RstDelayTimeRange) attribute and a Restart Delay Traffic Threshold (RstDelayTrafficThreshold) attribute. The two new attributes are as depicted in Table below.

| Attribute | Object | Description | Value |
|-----------|--------|-------------|-------|
| Restart Delay Time Range (RstDelayTimeRange) | Optical network unit | The optical line terminal performs a traffic detection on the optical network unit only in this time range or at this time value to determine the optical network unit to be in a silent state | IMMEDIATE Relative time Absolute time Periodic time Defaulted as IMMEDIATE |
| Restart Delay Traffic Threshold (RstDelayTrafficThreshold) | Optical network unit | The upper traffic limit below or at which the optical network unit is determined to be in a silent state, that is, the optical network unit is determined to be in a silent state when the traffic thereof is below or equal to the upper traffic limit | 0~65535 (data packet/minute) Defaulted as 5 packets per minute |

In a practical application, the values of the foregoing pair of attributes are well preset dependent upon the practical condition and stored in the optical line terminal by the operator. In the case that one optical line terminal manages and controls a plurality of optical network units, the values of the foregoing pair of attributes corresponding to each optical network unit are well preset and stored in the optical line terminal.

It shall be noted the first active image request mentioned above is used alone, that is, in the case that the value of the RstDelayTimeRange attribute and the value of the RstDelayTrafficThreshold attribute indicate that no time delay is required and no traffic detection is required to be performed on the optical network unit, the optical line terminal transmits the first active image request to the optical network unit upon completion of downloading the new software version.

The second active image request and the third active image request mentioned above are used in combination.

In the case that the value of the RstDelayTrafficThreshold attribute indicates that the traffic detection is required to be performed on the optical network unit, the optical line terminal firstly transmits the second active image request to the optical network unit upon completion of downloading the new software version. Then the optical line terminal performs the traffic detection on the optical network unit in the time range or at the time value indicated by the value of the RstDelayTimeRange attribute, and transmits the third active image request to the optical network unit when the detected traffic is below or equal to the value of the RstDelayTrafficThreshold attribute.

In the case that the value of the RstDelayTrafficThreshold attribute indicates no traffic detection is required to be performed on the optical network unit and the value of the RstDelayTimeRange attribute indicates a specific time value, the optical line terminal firstly transmits the second active image request to the optical network unit and then transmits the third active image request to the optical network unit at the specific time value indicated by the value of the RstDelayTimeRange attribute upon completion of downloading the new software version.

Examples of the values of the foregoing pair of attributes (i.e. the RstDelayTimeRange attribute and the RstDelayTrafficThreshold) will be given below.

(IMMEDIATE, 0): which indicates that no time delay is required and no traffic detection is required to be performed on the optical network unit, so the optical line terminal transmits the first active image request to the optical network unit upon completion of downloading the new software version.

(120, 0): which indicates that no traffic detection is required to be performed on the optical network unit, so the optical line terminal transmits the second active image request to the optical network unit upon completion of downloading the new software version and then transmits the third active image request to the optical network unit after an elapse of 120 minutes.

(2011-5-27 02:00, 0): which indicates that no traffic detection is required to be performed on the optical network unit, so the optical line terminal transmits the second active image request to the optical network unit upon completion of downloading the new software version and then will not transmit the third active image request to the optical network unit until 2:00 a.m. May 27, 2011 comes.

(IMMEDIATE, 5): which indicates that the optical line terminal performs the traffic detection on the optical network unit immediately after transmitting the second active image request and transmits the third active image request to the optical network unit when the detected traffic, for example, the number of data packets transmitted and received per minute is below or equal to 5.

(120, 5): which indicates that after transmitting the second active image request, the optical line terminal will not perform the traffic detection on the optical network unit until an elapse of 120 minutes is reached, and the optical line terminal transmits the third active image request to the optical network unit when the detected traffic, for example, the number of data packets transmitted and received per minute is below or equal to 5.

(2011-5-27 02:00-06:00, 5): which indicates that after transmitting the second active image request, the optical line terminal will not perform the traffic detection on the optical network unit until 2:00 a.m. May 27, 2011 comes, and the optical line terminal transmits the third active image request to the optical network unit when the detected traffic, for example, the number of data packets transmitted and received per minute is below or equal to 5 in the time range of 2:00 a.m. to 6:00 a.m., and if the case that the number of data packets transmitted and received per minute is below or equal to 5 is absent in the time range of 2:00 a.m. to 6:00 a.m., then the optical line terminal transmits the third active image request to the optical network unit at the end of the time range, i.e., 6:00 a.m.

(EVERDAY 02:00-06:00, 5): which indicates that after transmitting the second active image request, the optical line terminal performs the traffic detection on the optical network unit in the time range of 2:00 a.m. to 6:00 a.m. every day, and transmits the third active image request to the optical network unit when the detected traffic, for example, the number of data packets transmitted and received per minute is below or equal to 5.

The technical solutions of the invention will be described below with reference to the drawings.

Figure 2:
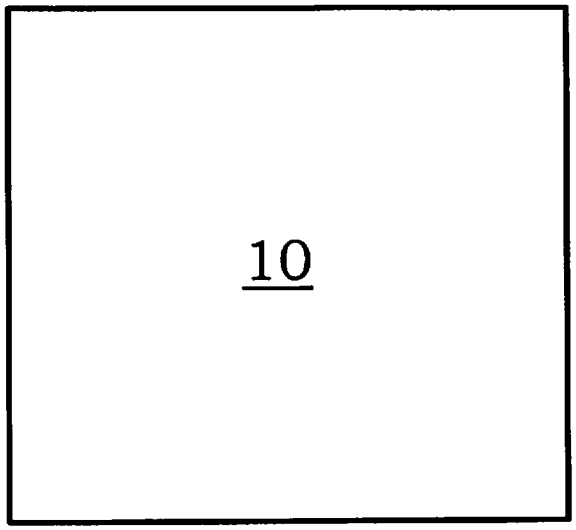
FIG. 2 is a block schematic representation of an optical line terminal and an optical network unit according to an embodiment of the invention.
Figure 2:
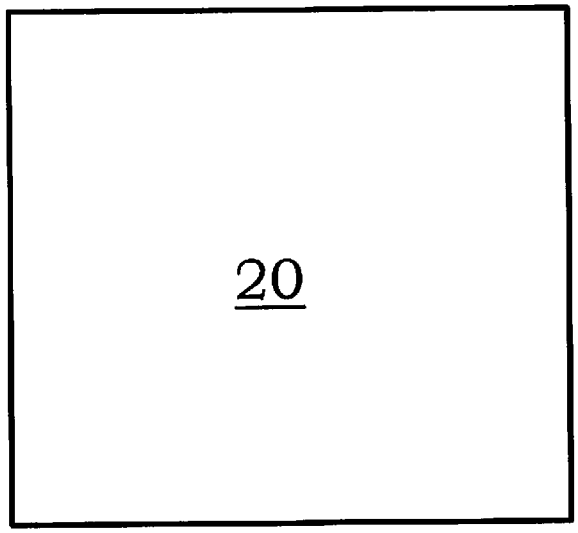

FIG. 1 illustrates a flow chart of a method of controlling an optical network unit to restart upon completion of downloading new software according to an embodiment of the invention. FIG. 2 is a block schematic representation of an optical line terminal 10 and an optical network unit 20 according to an embodiment of the invention.

When the optical line terminal 10 is required to provide the optical network unit 20 with a new software version, the optical line terminal 10 firstly transmits a software version information inquiry request (Get Request) to the optical network unit 20 to inquire about the software version currently used by the optical network unit 20. The optical network unit 20 transmits information of its currently used software version to the optical line terminal 10 via a software version information inquiry response (Get Response) upon reception of the software version information inquiry request (Get Request).

When the optical line terminal 10 determines whether the information of the software version in the software version information inquiry response (Get Response) matches the new software version thereof to be provided upon reception of the software version information inquiry response (Get Response). If there is no match, then the optical line terminal 10 transmits a File Write Request to the optical network unit 20. The optical network unit 20 transmits a File Transfer Acknowledgement to the optical line terminal 10 upon reception of the File Write Request.

Then the optical line terminal 10 divides the new software version into a plurality of data blocks and transmits them to the optical network unit 20 sequentially.

At the end of transmitting the last data block, the optical line terminal 10 transmits an End Download Request to the optical network unit 20. The optical network unit 20 writes the received respective data blocks from a memory into Flash upon reception of the End Download Request. The optical network unit 20 transmits an End Download Response to the optical line terminal 10 at the end of the write operation.

To this end, the downloading of the new software version has been completed.

It shall be noted that the foregoing respective steps are similar to downloading steps in the prior art, and a repeated description thereof will be omitted here for the sake of conciseness.

With reference to FIG. 1, upon completion of downloading the new software version, the optical line terminal 10 determines the type of the active image request to be transmitted based on the stored values, of the RstDelayTimeRange attribute and the RstDelayTrafficThreshold attribute, corresponding to the optical network unit 20 in Step S11.

If the value of the RstDelayTimeRange attribute and the value of the RstDelayTrafficThreshold attribute indicate that no time delay is required and no traffic detection is required to be performed on the optical network unit 20, then the optical line terminal 10 determines the first active image request to be the active image request to be transmitted.

Then in Step S12a, the optical line terminal 10 transmits the first active image request to the optical network unit 20.

The optical network unit 20 transmits the first active image response corresponding to the first active image request to the optical line terminal 10 and immediately restarts and activates the new software version that has been downloaded upon reception of the first active image request.

If the value of the RstDelayTrafficThreshold attribute indicates that no traffic detection is required to be performed on the optical network unit 20 and the value of the RstDelayTimeRange attribute indicates a specific time value, then the optical line terminal 10 determines the second active image request to be the active image request to be transmitted.

Then in Step S12b, the optical line terminal 10 transmits the second active image request to the optical network unit 20.

The optical network unit 20 transmits the second active image response corresponding to the second active image request to the optical line terminal 10 upon reception of the second active image request, and sets an activation flag to indicate that the new software version that has been downloaded shall be activated upon next time of restarting.

In Step S13b, the optical line terminal 10 receives the second active image response from the optical network unit 20.

Next, in Step S14b, the optical line terminal 10 transmits the third active image request to the optical network unit 20 at the specific time value indicated by the value of the RstDelayTimeRange attribute.

The optical network unit 20 transmits the third active image response corresponding to the third active image request to the optical line terminal 10 and immediately restarts upon reception of the third active image request. Since the optical network unit 20 sets the activation flag upon reception of the second active image request, the optical network unit 20 activates the new software version after restarting.

Then in Step S15b, the optical line terminal 10 receives the third active image response from the optical network unit 20.

If the value of the RstDelayTrafficThreshold attribute indicates that the traffic detection is required to be performed on the optical network unit 20, then the optical line terminal 10 determines the second active image request to be the active image request to be transmitted.

Then in Step 12c, the optical line terminal 10 transmits the second active image request to the optical network unit 20.

The optical network unit 20 transmits the second active image response corresponding to the second active image request to the optical line terminal 10 upon reception of the second active image request, and sets an activation flag to indicate that the new software version that has been downloaded shall be activated upon next time of restarting.

In Step S13c, the optical line terminal 10 receives the second active image response from the optical network unit 20.

Next in Step S14c, the optical line terminal 10 performs the traffic detection on the optical network unit 20 in the time range or at the time value indicated by the value of the RstDelayTimeRange attribute.

When the detected traffic, for example, the number of data packets transmitted and received per minute, is below or equal to the value of the RstDelayTrafficThreshold attribute, the optical line terminal 10 transmits the third active image request to the optical network unit 20 in Step S15c.

The optical network unit 20 transmits the third active image response corresponding to the third active image request to the optical line terminal 10 and immediately restarts upon reception of the third active image request. Since the optical network unit 20 sets the activation flag upon reception of the second active image request, the optical network unit 20 activates the new software version after restarting.

Then in Step S16c, the optical line terminal 10 receives the third active image response from the optical network unit 20.

Upon reception of the first active image response or the third active image response from the optical network unit 20, the optical line terminal 10 will not transmit a Commit Image Request to the optical network unit 20 until the optical network unit 20 restarts.

The optical network unit 20 transmits a Commit Image Response to the optical line terminal 10 upon reception of the Commit Image Request.

In another embodiment, the optical network unit 20 is manually restarted after the optical line terminal 10 transmits the second active image request to the optical network unit 20 and the optical network unit 20 sets the activation flag in response to the second active image request and before the optical line terminal 10 transmits the third active image request. And then after the optical network unit 20 is manually restarted, for example, the optical line terminal 10 can transmit the third active image request to the optical network unit 20. Since the optical network unit 20 has restarted and activated the new software version, the optical network unit 20 will only return the third active image response to the optical line terminal 10 without restarting upon reception of the third active image request.

Alternatively, after the optical network unit 20 is manually restarted, the optical line terminal 10 may fetch on its own initiative from the optical network unit 20 the currently run software version thereof, and if the currently run software version is the new software version, then the optical line terminal 10 will not transmit the third active image request to the optical network unit 20 any more but instead directly transmit the Commit Image Request to the optical network unit 20.

In a further embodiment, it is assumed that the optical line terminal 10 does not know whether the optical network unit 20 supports the restart delay solution of the invention. Then the optical line terminal 10 will firstly acquire capability information of the optical network unit 20, the capability information indicating whether the optical network unit 20 supports the restart delay solution.

If the optical line terminal 10 fails to acquire the capability information or knows from the acquired capability information that the optical network unit 20 does not support the restart delay solution, then it means that the optical network unit 20 can not recognize the separately transmitted two new active software version requests (i.e., the second new active software version request and the third new active software version request transmitted in sequence), so in this case the value of the RstDelayTimeRange attribute of the optical network unit 20 can be set to "IMMEDIATE" and the value of the RstDelayTrafficThreshold attribute thereof can preferably be set to 20.

Hereupon the optical line terminal 10 detects traffic data of the optical network unit 20 immediately upon completion of downloading the new software version.

The optical line terminal 10 transmits the first active image request to the optical network unit 20 when the detected traffic, for example, the number of data packets transmitted and received per minute, is below or equal to 20.

Upon reception of the first active image request, the optical network unit 20 transmits the first active image response corresponding to the first active image request to the optical line terminal 10, and immediately restarts and activates the new software version that has been downloaded.

It will be apparent to those skilled in the art that the invention will not be limited to the details of the foregoing illustrative embodiments but can be embodied in other specific forms without departing from the spirit or essential principle of the invention. Therefore the embodiments shall be construed in any aspect as illustrative but not limiting, and any reference numerals in the claims shall not be taken as limiting the claims where they appear. Furthermore it will be apparent that the term "comprise" will not preclude another element(s) or step(s), and the term "a/an" preceding an element will not preclude "a plurality of" such elements. A plurality of elements recited in a product claim can alternatively be embodied as a single element in software or hardware. The terms "first", "second", etc., will be used to represent a name instead of any specific order.

The invention claimed is:

1. A method, in an optical line terminal of an optical communication network, of instructing an optical network unit to restart, the method comprising:
   upon completion of downloading a new software version, determining a type of an active image request to be transmitted to the optical network unit based upon stored values of a RstDelayTimeRange attribute and of a RstDelayTrafficThreshold attribute corresponding to the optical network unit, wherein,
   the determining the type of the active image request to be transmitted includes determining whether to transmit one of,
      a first active image request that includes an instruction to the optical network unit to immediately restart and activate the new software version upon immediately restarting,
      a second active image request that includes an instruction to the optical network unit to activate the new software version upon a next time of restarting of the optical network unit, such that the optical network unit refrains from restarting until an instruction to restart is transmitted to the optical network unit from the optical line terminal, or
      a third active image request that includes an instruction to the optical network unit to immediately restart,
   the RstDelayTimeRange attribute is used for indicating a time range or a time value in or at which a traffic detection is performed on the optical network unit, and
   the RstDelayTrafficThreshold attribute is used for indicating an upper traffic limit below or at which the optical network unit is determined to be in a silent state; and
   transmitting the determined first active image request, second active image request, or third active image request to the optical network unit.

2. The method according to claim 1, wherein,
the determining the type of the active image request to be transmitted to the optical network unit includes,
if the value of the RstDelayTimeRange attribute and the value of the RstDelayTrafficThreshold attribute indicate that no time delay is required and no traffic detection is required to be performed on the optical network unit, then the first active image request is determined to be the active image request to be transmitted, and
the transmitting the determined first active image request, second active image request, second active image request, or third active image request to the optical network unit includes,
transmitting the first active image request to the optical network unit, wherein the first active image request is used for instructing the optical network unit to immediately restart and activate the new software version that has been downloaded, and
the method further includes receiving a first active image response corresponding to the first active image request from the optical network unit, subsequently to the transmitting the determined first active image request, second active image request, second active image request, or third active image request to the optical network unit.

3. The method according to claim 1, wherein,
the determining the type of the active image request to be transmitted to the optical network unit includes,
if the value of the RstDelayTrafficThreshold attribute indicates that no traffic detection is required to be performed on the optical network unit and the value of the RstDelayTimeRange attribute indicates a specific time value, determining the second active image request to be the active image request to be transmitted, and
the transmitting the determined first active image request, second active image request, or third active image request to the optical network unit includes,
transmitting the second active image request to the optical network unit, wherein the second active image request is used for instructing the optical network unit to set an activation flag, the activation flag being used to indicate that the new software version that has been downloaded shall be activated upon next time of restarting, such that the optical network unit refrains from restarting until an instruction to restart is transmitted to the optical network unit from the optical line terminal, and
the method further includes, subsequently to the transmitting the determined first active image request, second active image request, or third active image request to the optical network unit,
receiving a second active image response corresponding to the second active image request from the optical network unit;
transmitting the a third active image request to the optical network unit at the specific time value indicated by the value of the RstDelayTimeRange attribute, wherein the third active image request includes an instruction to is used for instructing the optical network unit to restart immediately; and
receiving a third active image response corresponding to the third active image request from the optical network unit.

4. The method according to claim 1, wherein, the determining the type of the active image request to be transmitted to the optical network unit includes,
if the value of the RstDelayTrafficThreshold attribute indicates that the traffic detection is required to be performed on the optical network unit, determining the second active image request to be the active image request to be transmitted, and
the transmitting the determined first active image request, second active image request, or third active image request to the optical network unit includes,
transmitting the second active image request to the optical network unit, wherein the second active image request is used for instructing the optical network unit to set an activation flag, the activation flag being used to indicate that the new software version that has been downloaded shall be activated upon next time of restarting, such that the optical network unit refrains from restarting until an instruction to restart is transmitted to the optical network unit from the optical line terminal, and
the method further includes, subsequently to the transmitting the determined first active image request, second active image request, or third active image request to the optical network unit,
receiving a second active image response corresponding to the second active image request from the optical network unit;
performing the traffic detection on the optical network unit in the time range or at the time value indicated by the value of the RstDelayTimeRange attribute;
when detected traffic is below or equal to the value of the RstDelayTrafficThreshold attribute, transmitting a third active image request to the optical network unit, wherein the third active image request includes an instruction to the optical network unit to restart immediately; and
receiving a third active image response corresponding to the third active image request from the optical network unit.

5. A method, in an optical line terminal of an optical communication network, of instructing an optical network unit to restart, the method comprising:
upon completion of downloading a new software version, detecting traffic on the optical network unit based upon stored values of a RstDelayTimeRange attribute and of a RstDelayTrafficThreshold attribute corresponding to the optical network unit, wherein the RstDelayTimeRange attribute is used for indicating a time range in which a traffic detection is performed on the optical network unit, and the RstDelayTrafficThreshold attribute is used for indicating an upper traffic limit below or at which the optical network unit is determined to be in a silent state;
if the detected traffic is greater than the value of the RstDelayTrafficThreshold attribute, transmitting an active image request to the optical network unit, wherein the active image request includes an instruction to the optical network unit to activate the new software version that has been downloaded upon a next time of restarting of the optical network unit, such that the optical network unit refrains from restarting until an instruction to restart is transmitted to the optical network unit from the optical line terminal;
receiving an active image response corresponding to the first active image request from the optical network unit; and
subsequently to receiving the active image response, detecting traffic on the optical network unit in the time range or at the time value indicated by the value of the RstDelayTimeRange attribute;

when detected traffic is below or equal to the value of the RstDelayTrafficThreshold attribute, transmitting a separate active image request to the optical network unit, wherein the separate active image request includes an instruction to the optical network unit to restart immediately; and receiving a separate active image response corresponding to the separate active image request from the optical network unit.

6. A method, in an optical network unit of an optical communication network, for restarting in response to an instruction of an optical line terminal, the method comprising:

upon completion of downloading a new software version, receiving an active image request from the optical line terminal;

determining a type of the active image request, wherein the determining the type of the active image request includes determining whether the active image request is one of a first active image request associated with immediately restarting and activating the new software version, or a second active image request associated with activating the new software version upon a next restart of the optical network unit, such that the optical network unit refrains from restarting until an instruction to restart is transmitted to the optical network unit from the optical line terminal;

based on the determining the type of the active image request, implementing one of, if the active image request is determined to be the first active image request, transmitting a first active image response corresponding to the first active image request to the optical line terminal and immediately restarting and activating the new software version that has been downloaded, or if the active image request is determined to be the second active image request, transmitting a second active image response corresponding to the second active image request to the optical line terminal, and setting an activation flag, the activation flag being used to indicate that the new software version that has been downloaded shall be activated upon next time of restarting, such that the optical network unit refrains from restarting until an instruction to restart is transmitted to the optical network unit from the optical line terminal;

receiving a third active image request from the optical line terminal, the third active image request including an instruction to immediately restart; and transmitting a third active image response corresponding to the third active image request to the optical line terminal, and restarting immediately.

7. An apparatus, in an optical line terminal of an optical communication network, for instructing an optical network unit to restart, the apparatus comprising:

a memory storing computer readable instructions; and a processor configured to execute the computer readable instructions to, upon completion of downloading a new software version, determine a type of an active image request to be transmitted based upon stored values of a RstDelayTimeRange attribute and of a RstDelayTrafficThreshold attribute corresponding to the optical network unit, wherein the type of an active image request is one of, a first active image request that includes an instruction to the optical network unit to immediately restart and activate the new software version, a second active image request that includes an instruction to the optical network unit to activate the new software version upon a next time of restarting of the optical network unit, such that the optical network unit refrains from restarting until an instruction to restart is transmitted to the optical network unit from the optical line terminal, or a third active image request that includes an instruction to the optical network unit to immediately restart, the RstDelayTimeRange attribute is used for indicating a time range or a time value in or at which a traffic detection is performed on the optical network unit, and the RstDelayTrafficThreshold attribute is used for indicating an upper traffic limit below or at which the optical network unit is determined to be in a silent state; and transmit the determined first active image request, second active image request, or third active image request to the optical network unit.

8. The apparatus according to claim 7, wherein, the processor is configured to execute computer readable instructions to, if the value of the RstDelayTimeRange attribute and the value of the RstDelayTrafficThreshold attribute indicate that no time delay is required and no traffic detection is required to be performed on the optical network unit, determine the first active image request to be the active image request to be transmitted, and transmit the first active image request to the optical network unit, wherein the first active image request is used for instructing the optical network unit to immediately restart and activate the new software version that has been downloaded; and the processor is further configured to execute computer readable instructions to, receive a first active image response corresponding to the first active image request from the optical network unit.

9. The apparatus according to claim 7, wherein, the processor is configured to execute computer readable instructions to, if the value of the RstDelayTrafficThreshold attribute indicates that no traffic detection is required to be performed on the optical network unit and the value of the RstDelayTimeRange attribute indicates a specific time value, determine the second active image request to be the active image request to be transmitted, and transmit the second active image request to the optical network unit, wherein the second active image request is used for instructing the optical network unit to set an activation flag, the activation flag being used to indicate that the new software version that has been downloaded shall be activated upon next time of restarting, such that the optical network unit refrains from restarting until an instruction to restart is transmitted to the optical network unit from the optical line terminal, and the processor is further configured to execute computer readable instructions to,
    receive a second active image response corresponding to the second active image request from the optical network unit;
    transmit the third active image request to the optical network unit at the specific time value indicated by the value of the RstDelayTimeRange attribute, wherein the third active image request includes an instruction to the optical network unit to immediately restart; and
    receive a third active image response corresponding to the third active image request from the optical network unit.

10. The apparatus according to claim 7, wherein,
the processor is configured to execute computer readable instructions to,
    if the value of the RstDelayTrafficThreshold attribute indicates that the traffic detection is required to be performed on the optical network unit, determine the second active image request to be the active image request to be transmitted, and
    transmit the second active image request to the optical network unit, wherein the second active image request is used for instructing the optical network unit to set an activation flag, the activation flag being used to indicate that the new software version that has been downloaded shall be activated upon next time of restarting, such that the optical network unit refrains from restarting until an instruction to restart is transmitted to the optical network unit from the optical line terminal, and
the processor is further configured to execute computer readable instructions to,
    receive a second active image response corresponding to the second active image request from the optical network unit;
    perform the traffic detection on the optical network unit in the time range or at the time value indicated by the value of the RstDelayTimeRange attribute;
    when detected traffic is below or equal to the value of the RstDelayTrafficThreshold attribute, transmit the third active image request to the optical network unit, wherein the third active image request includes an instruction to the optical network unit to immediately restart; and
    receive a third active image response corresponding to the third active image request from the optical network unit.

11. An apparatus, in an optical network unit of an optical communication network, for restarting in response to an instruction of an optical line terminal, the apparatus comprising:
    a memory storing computer readable instructions; and
    a processor configured to execute the computer readable instructions to,
    receive an active image request from the optical line terminal upon completion of downloading a new software version;
    determine a type of the active image request, and performing an operation corresponding to the type of the active image request according to the type, wherein the determining the type of the active image request includes determining whether the active image request is one of
        a first active image request associated with immediately restarting and activating the new software version, or
        a second active image request associated with activating the new software version upon a next restart of the optical network unit, such that the optical network unit refrains from restarting until an instruction to restart is transmitted to the optical network unit from the optical line terminal;
    based on the determining the type of the active image request, implement one of,
        if the active image request is determined to be the first active image request, transmit a first active image response corresponding to the first active image request to the optical line terminal and immediately restarting and activating the new software version that has been downloaded, or
        if the active image request is determined to be the second active image request,
            transmit a second active image response corresponding to the second active image request to the optical line terminal, and setting an activation flag, the activation flag being used to indicate that the new software version that has been downloaded shall be activated upon next time of restarting, such that the optical network unit refrains from restarting until an instruction to restart is transmitted to the optical network unit from the optical line terminal;
            receive a third active image request from the optical line terminal, the third active image request including an instruction to restart immediately; and
            transmit a third active image response corresponding to the third active image request to the optical line terminal, and restart immediately.

* * * * *